Jan. 19, 1943.  T. THOMPSON  2,308,794
KICK STAND FOR BICYCLES
Filed Nov. 16, 1940
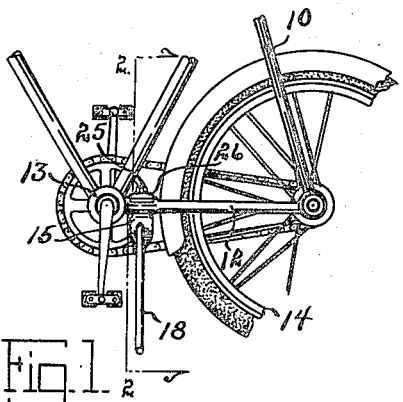
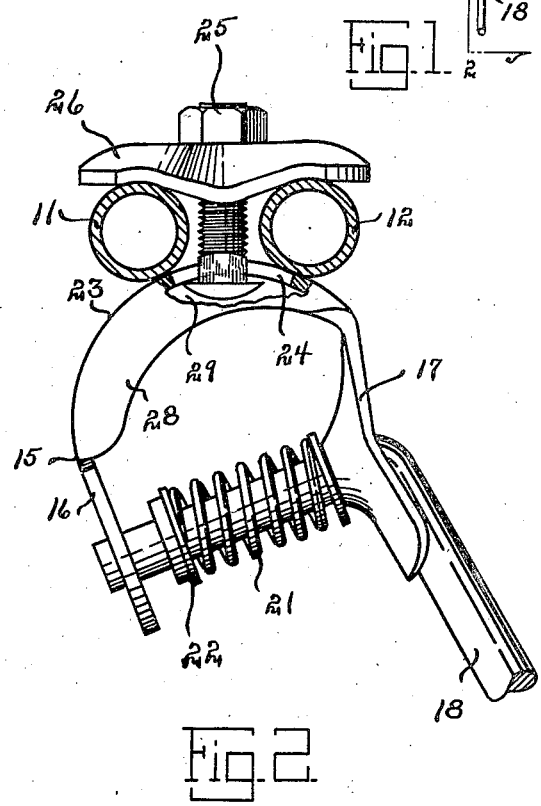
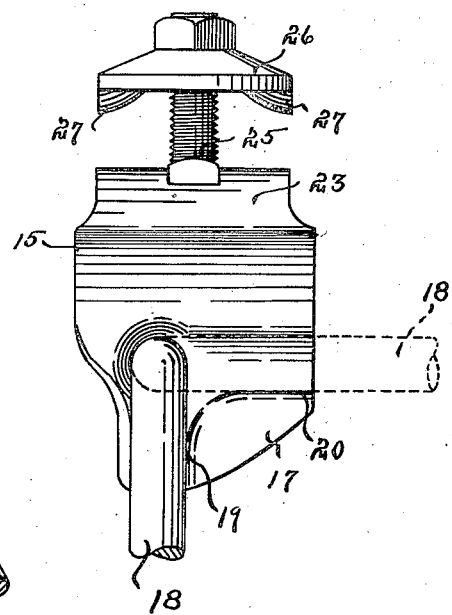
INVENTOR.
THOMAS THOMPSON
BY M. Talbert Dick Patented Jan. 19, 1943

2,308,794

UNITED STATES PATENT OFFICE 2,308,794

KICK STAND FOR BICYCLES

Thomas Thompson, Des Moines, Iowa, assignor of one-half to Carl A. Shepard, Des Moines, Iowa Application November 16, 1940, Serial No. 365,971

2 Claims. (Cl. 280—301)

This invention relates to bicycle stands of the kick stand type for supporting bicycles and like in substantially an upright position when not in use.

The principal object of this invention is to provide a kick stand for a bicycle or like that may be quickly rigidly attached and adjusted on a bicycle by the improvement of a single bolt.

More specifically, the object of this invention is to provide a kick stand for bicycles wherein the base portion of the stand has a curved upper portion for engagement with the under side of the two frame bars of the bicycle to which it is attached so that the operating angularity of the supporting rod may be adjustably had.

A further object of my invention is to provide a kick stand that is neat in appearance, comparatively light in weight, economical in manufacture, and durable in use.

These and other objects will be apparent to those skilled in the art.

My invention consists in the construction, arrangement and combination of the various parts of the device, whereby the objects contemplated are attained as hereinafter more fully set forth, pointed out in my claims, and illustrated in the accompanying drawing, in which:

Fig. 1 is a side view of the center portion of a bicycle with my kick stand mounted thereon.

Fig. 2 is an enlarged front view of the main portion of my kick stand taken on line 2—2 of Fig. 1.

Fig. 3 is an enlarged side view of my kick stand with the outer end of the supporting rod broken away.

The use of kick stands on bicycles for supporting the same when not in use is old. Some of the objections to most bicycle stands of this type are that the kick stands are not easily attached, and when attached do not rigidly hold their position, are not universal for attachment to different types and sizes of bicycles, and cannot be successfully adjusted to various positions relative to the bicycle frame. I have overcome such objections as will be hereinafter set forth.

Referring to the drawing, I have used the numeral 10 to designate a bicycle having the usual two spaced apart frame bars 11 and 12 extending substantially horizontal from the hanger bearing housing 13 to the axle of the rear bicycle wheel 14. It is to these two frame bars 11 and 12 and closely adjacent the bearing housing 13 that supports the crank pedal assembly that I secure my kick stand. I have used the numeral 15 to generally designate the base portion of my stand which may be considered to be of inverted U construction. The numerals 16 and 17 designate the two spaced apart end portions of the inverted U-base member 15 as shown in the drawing. These two end or ear portions rotatably support the kick stand rod 18. This rod 18 is similar to other kick stand rods in that its upper end is bent at substantially a right angle to rotatably extend through the ear portions 16 and 17. The free end portion of the rod 18 extends outwardly and downwardly in the usual manner for engagement with the supporting surface when in a vertical supporting position. In the ear portion 17, I have provided a downwardly extending trough portion 19. Obviously when the rod 18 is in an operative supporting position, its upper end portion falls into and engages this groove 19, thereby yieldingly holding the rod in position. The numeral 20 designates the horizontal trough portion formed in the ear portion 17 for receiving and yieldingly holding the rod 18 in an inoperative position when in position as shown by dotted lines in Fig. 3. The rod 18 is yieldingly held toward and in these grooved depressions 19 and 20 by a coil spring 21. This coil spring 21 embraces the rod 18 between the two ear portions 16 and 17 and has one of its ends operatively engaging the inner side of the ear 17 and its other end engaging a stop 22 on the rod 18 as shown in Fig. 2. The operation of this portion of my kick stand is similar to that of kick stands now on the market. The numeral 23 designates the top portion of the member 15. This top portion has its upper surface curved in a line transversely of the longitudinal axis of each of the two bicycle frame bars 11 and 12 as shown in Fig. 2. This curved top portion of the base portion of the kick stand is designed to engage the under sides of the two frame portions 11 and 12 and as these two members 11 and 12 are spaced apart from each other, the upper portion of the member 15 will slightly curve upwardly and between the two members 11 and 12 as shown in Fig. 2. The numeral 24 designates a slot opening in the upper portion of the member 15 and which extends longitudinally with the top portion 23. This slot opening is designed to receive the length of the securing bolt 25. The head of the bolt 25 engages the inside bottom of the base 15. The numeral 26 designates the top bar of the device. This bar 26 is pierced near its center by the bolt 25 and rests on top of the two bicycle frame bars 11 and 12. This bar 26 has its two outer end portions curved to conform to and extend over the upper portions of the frame bars 11 and 12 of the bicycle. Each side portion of the length of the member 26 is bent downwardly to form the two curved projections 27 as shown in Fig. 3. These two projections extend downwardly between the two bicycle frame bars 11 and 12 for centering and holding the bar 26 of the kick stand in proper position on the two members 11 and 12. By this construction, the bar 26 of the kick stand will always remain in the same and proper position on top of the two bicycle frame portions 11 and 12, but if the bolt is loosened for adjustment purposes, the base 15 of the stand may be rolled to the right or left relative to the portions 11 and 12 of the bicycle. This possible rolling action for the adjustment of the kick stand is possible due to the curved top portion 23 extending downwardly and outwardly in curved lines in both directions from the bolt 25 and also by the longitudinal slot 24, which permits the bolt to remain stationary during the adjusting of the base portion 15 relative to the bicycle. By rotating the base 15 so that the end portions 16 and 17 approach vertical planes, the supporting rod 18 will also closer approach a vertical plane, thereby bring its lower end portion closer to the supporting surface when it is in a lowered operative position. If the base 15 is rotated or rolled in the opposite direction relative to the bicycle, the ear portions 16 and 17 will move to greater angles relative to the vertical and the lower end portion of the supporting rod 18 will be accordingly adjusted relative to the bicycle. By adjusting the device with the rotation of the base 15, my kick stand may be easily and quickly adjusted to said bicycles of different size and type and any bicycle may be adjusted so that it will be held and supported at the desired angle of the user. After the desired adjustment is obtained, the bolt 25 is tightened, thereby rigidly clamping the base 15 and bar 26 on, above, below and to the members 11 and 12 of the bicycle. One important feature of the device is its strength relative to its weight. Great strength is given to the upper portion of the member 15 by bending, at the time of manufacture, the two upper marginal side edge portions 28 and 29 downwardly. The base member 15 is formed from a single piece of sheet metal.

Some changes may be made in the construction and arrangement of my improved kick stand for bicycles without departing from the real spirit and purpose of my invention, and it is my intention to cover by my claims any modified forms of structure or use of mechanical equivalents which may be reasonably included within their scope.

I claim:

1. In a device of the class described a base member having a substantially continuously curved convex upper surface designed to engage the bottom side portions of two spaced apart bicycle rod frame members, a supporting member secured to said base member, an elongated slot opening in the upper portion of said base member, a bar member designed to engage the upper side portions of said rod frame members, and a bolt extending through said elongated slot opening and said bar.

2. In a device of the class described a one piece base member having a substantially continuously curved upper surface designed to engage the under side portions of two spaced apart bicycle rod frame members, an elongated slot opening in the upper portion of said base member, a bar member designed to rest on the upper side portions of said rod frame members, a bolt extending through said elongated slot opening and said bar, a supporting member rotatably mounted on said base member and positioned adjacent one side of said base member, a yieldable means for retaining said supporting member in contact with said side of said base member, and a raised area integrally formed with said side of said base member adjacent said supporting member whereby the position of said supporting member may be controlled.

THOMAS THOMPSON.